(12) United States Patent
Becker et al.

(10) Patent No.: US 10,302,210 B2
(45) Date of Patent: May 28, 2019

(54) STAKING RING FOR SOLENOID ASSEMBLY

(71) Applicant: Schaeffler Technologies AG & Co. KG, Herzogenaurach (DE)

(72) Inventors: David Becker, White Lake, MI (US); David Chandler, Windsor (CA)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 140 days.

(21) Appl. No.: 15/642,823

(22) Filed: Jul. 6, 2017

(65) Prior Publication Data

US 2019/0011056 A1    Jan. 10, 2019

(51) Int. Cl.
*F16K 31/06*    (2006.01)
*F16K 27/00*    (2006.01)

(52) U.S. Cl.
CPC .............. *F16K 27/00* (2013.01); *F16K 31/06* (2013.01)

(58) Field of Classification Search
CPC ...... F16K 27/00; F16K 27/029; F16K 27/041; F16K 27/048
USPC .................................................... 137/315.03
See application file for complete search history.

(56) References Cited

U.S. PATENT DOCUMENTS

| 6,463,951 | B2 | 10/2002 | Shost |
| 6,581,634 | B2 | 6/2003 | Najmolhoda et al. |
| 6,684,901 | B1 * | 2/2004 | Cahill ................. F16K 31/0655 137/15.18 |
| 7,017,885 | B2 * | 3/2006 | Hirata ................. F16K 31/0613 137/315.03 |
| 2002/0145125 | A1 * | 10/2002 | Tomoda .............. F16K 31/0631 251/129.15 |
| 2005/0274336 | A1 * | 12/2005 | Wagner ............... F16K 31/0637 123/90.12 |
| 2011/0121214 | A1 * | 5/2011 | Stoeckel ............. F16K 31/0634 251/129.01 |
| 2013/0302545 | A1 * | 11/2013 | Schnelker ............ B23K 33/006 428/34.1 |
| 2015/0048270 | A1 * | 2/2015 | Bamber ................. H01F 7/081 251/129.15 |
| 2015/0330271 | A1 * | 11/2015 | Lappan ................. F04B 49/002 137/625.48 |
| 2017/0114916 | A1 * | 4/2017 | Muraoka ................. H01F 7/126 |

FOREIGN PATENT DOCUMENTS

EP    1965112 A1    9/2008

* cited by examiner

*Primary Examiner* — Reinaldo Sanchez-Medina
(74) *Attorney, Agent, or Firm* — Volpe and Koenig, P.C.

(57) ABSTRACT

A method of assembling a solenoid valve assembly is provided. The method includes supporting a shoulder of a valve housing against a flange of a metal ring. The method includes inserting at least one axially extending post of the metal ring through at least one slot of a mounting tab. The method includes deforming the at least one axially extending post of the metal ring to clamp the valve housing between the metal ring and the mounting tab, with the metal ring, the valve housing, and the mounting tab being captively secured with each other. The method includes positioning the mounting tab at least partially within an opening at an axial end of a solenoid housing. The method includes bending or otherwise deforming the outer wall at the axial end of the solenoid housing to retain the solenoid housing to the mounting tab, the metal ring, and the valve housing.

17 Claims, 4 Drawing Sheets

STAKING RING FOR SOLENOID ASSEMBLY

FIELD OF INVENTION

This application is generally related to a solenoid assembly, and more particularly related to a connection between a solenoid housing and a valve housing of a solenoid assembly.

BACKGROUND

Solenoid assemblies are used in a wide range of applications. Solenoid assemblies generally include a solenoid housing configured to retain a solenoid assembly, and a valve housing configured to retain a valve body. A mounting tab is typically arranged between the solenoid housing and the valve housing for connecting the solenoid housing and the valve housing to each other.

U.S. Pat. Nos. 6,463,951, 6,581,634, and EP 1965112 each disclose various solenoid assemblies which require a heat staking process and/or ultrasonic staking process for attaching sub-components of the solenoid assemblies. Heat staking and ultrasonic staking processes require expensive tools, complex assembly, and personnel expertise in order to provide a reliable connection between the solenoid assembly sub-components.

It would be desirable to provide a configuration for attaching a solenoid housing to a valve housing in a solenoid assembly that is relatively inexpensive, uncomplicated, and reliable.

SUMMARY

A method of assembling a solenoid valve assembly is provided. The method includes providing a metal ring, a valve housing, a solenoid housing, and a mounting tab. The metal ring includes an annular body with at least one axially extending post and a radially inwardly extending flange. The valve housing includes a radially outwardly extending shoulder. The solenoid housing includes an outer wall defining an opening at an axial end. The mounting tab includes an aperture and at least one slot.

The shoulder of the valve housing is supported against the flange of the metal ring, and the at least one axially extending post is inserted through the at least one slot of the mounting tab. The method includes deforming the at least one axially extending post of the metal ring to clamp the valve housing between the metal ring and the mounting tab, with the metal ring, the valve housing, and the mounting tab being captively secured with each other. The method includes positioning the mounting tab at least partially within the opening at the axial end of the solenoid housing. Finally, the method includes bending the outer wall at the axial end of the solenoid housing to retain the solenoid housing to the mounting tab, the metal ring, and the valve housing.

The metal ring provides a simplified and inexpensive process for assembling a solenoid valve assembly compared to other assembly methods that require heat staking or ultrasonic staking. In one embodiment, the at least one axially extending post of the metal ring is mechanically deformed. In one embodiment the at least one axially extending post of the metal ring is deformed by swaging or staking.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
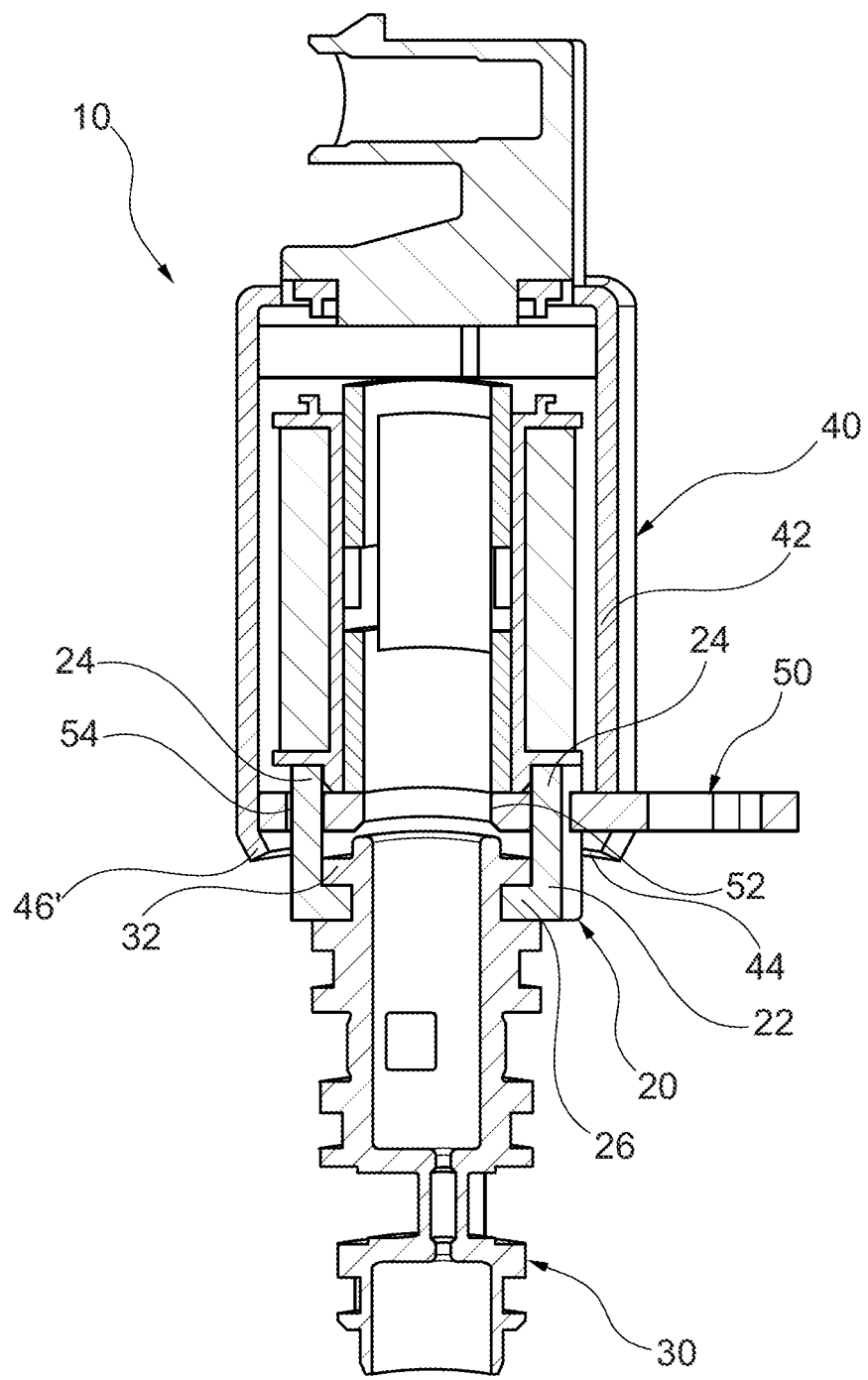
FIG. 1 is a cross-sectional view of a solenoid assembly including a metal ring according to one embodiment.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
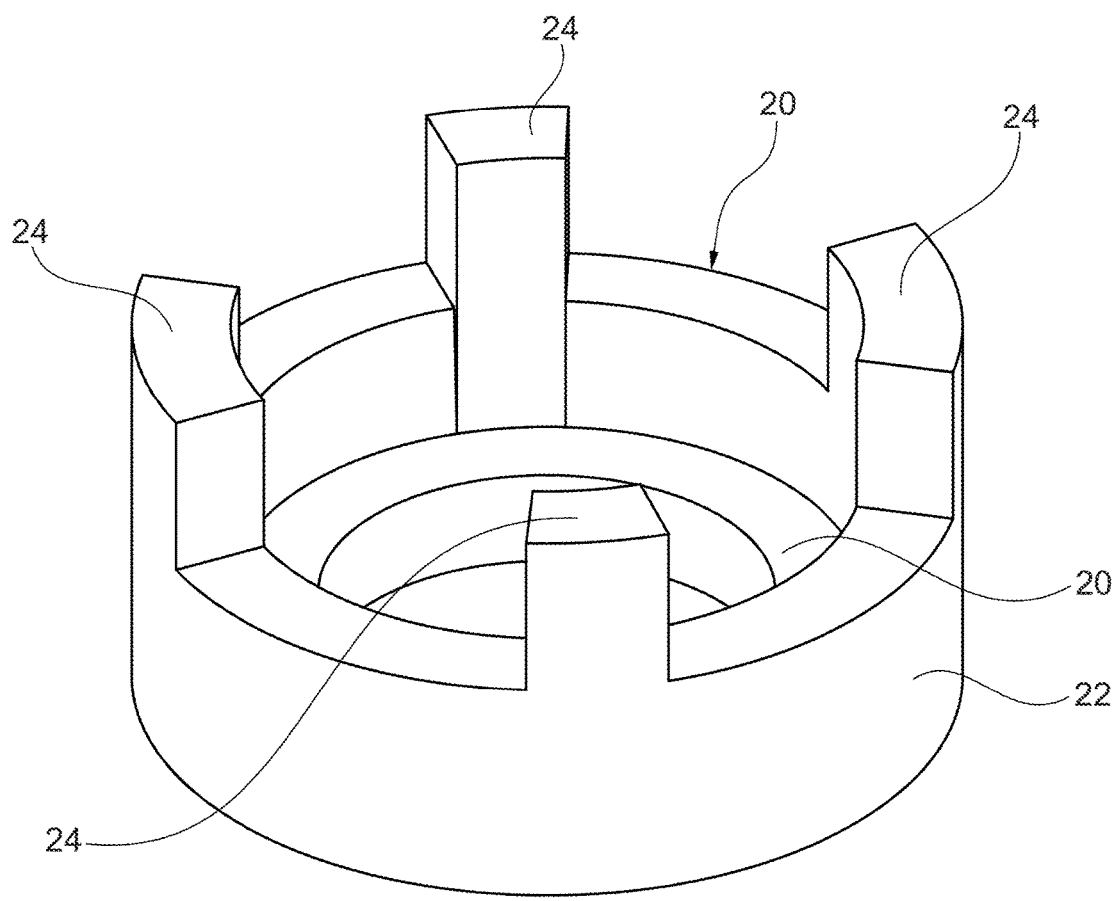
FIG. 2 is a perspective view of the metal ring of FIG. 1.
Figure 3:
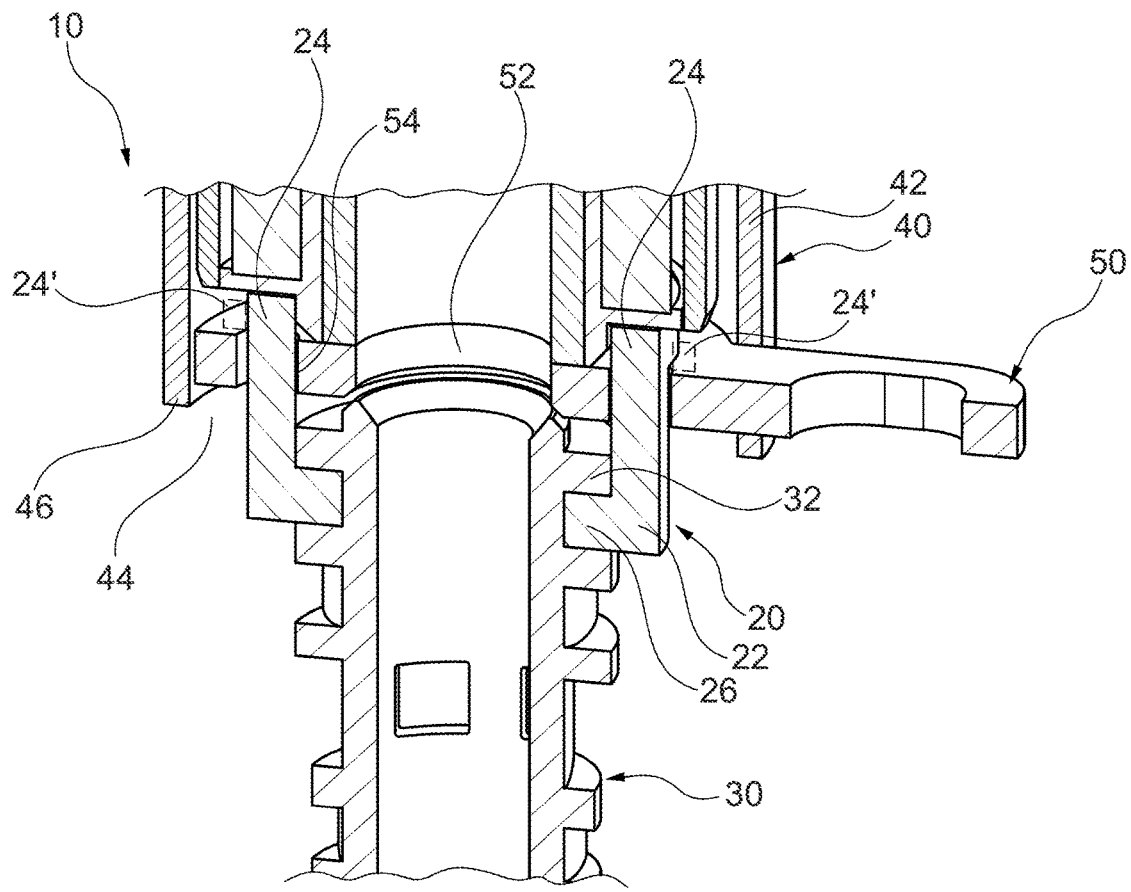
FIG. 3 is a magnified view of the solenoid assembly showing posts of the metal ring in broken lines.

FIGS. 1-3 illustrate a first embodiment of a solenoid valve assembly 10, for which a method of assembling the solenoid valve assembly 10 is provided. The solenoid valve assembly 10 includes a metal ring 20, a valve housing 30, a solenoid housing 40, and a mounting tab 50. The metal ring 20 includes an annular body 22 with at least one axially extending post 24 and a radially inwardly extending flange 26. The valve housing 30 includes a radially outwardly extending shoulder 32. The solenoid housing 40 includes an outer wall 42 defining an opening 44 at an axial end 46 of the solenoid housing 40. The mounting tab 50 includes an aperture 52 and at least one slot 54.

The method includes supporting the shoulder 32 of the valve housing 30 against the flange 26 of the metal ring 20. The method includes inserting the at least one axially extending post 24 through the at least one slot 54 of the mounting tab 50. Next, the method includes deforming the at least one axially extending post 24 of the metal ring 20 to clamp the valve housing 30 between the metal ring 20 and the mounting tab 50, such that the metal ring 20, the valve housing 30, and the mounting tab 50 are captively secured with each other. The mounting tab 50 is then positioned at least partially within the opening 44 at the axial end 46 of the solenoid housing 40. This step is shown most clearly in FIG. 3, prior to bending the outer wall 42 of the solenoid housing 40. Finally, the method includes bending the outer wall 42 at the axial end 46' of the solenoid housing 40 to retain the solenoid housing 40 to the mounting tab 50, the metal ring 20, and the valve housing 30, as illustrated in FIG. 1. One of ordinary skill in the art would recognize from the present disclosure that the axial end 46' can be crimped, bent, or otherwise deformed. Additional assembly steps can be provided, such as inserting a valve body into the valve housing 30 and inserting a solenoid assembly into the solenoid housing 40.

Figure 4:
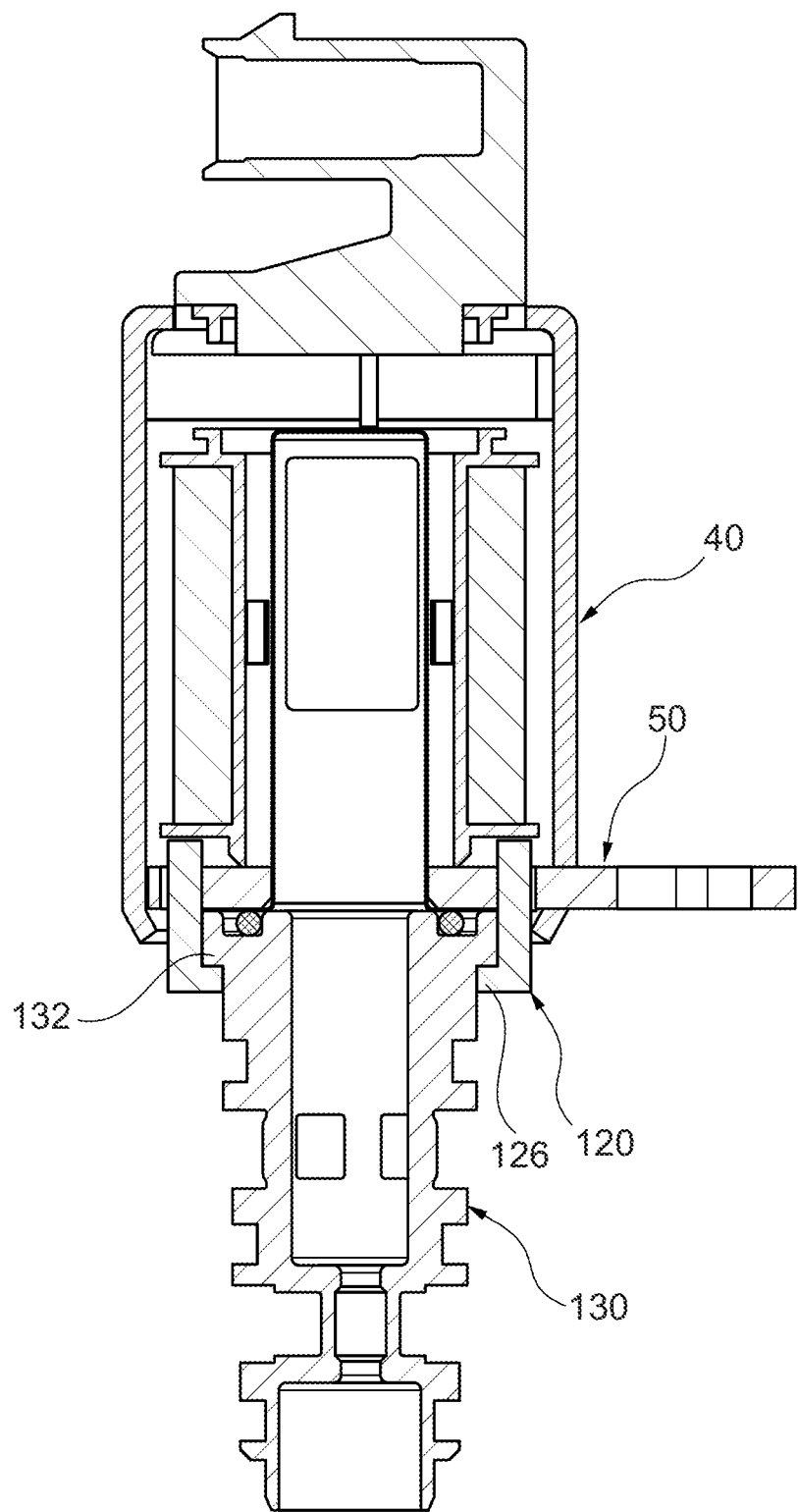
FIG. 4 is a cross-sectional view of a solenoid assembly including a metal ring according to another embodiment.

In the embodiment shown in FIGS. 1-3, the shoulder 32 of the valve housing 30 is insert molded with the flange 26 of the metal ring 20. In the embodiment shown in FIG. 4, the flange 126 of the metal ring 120 is slip-fitted around the shoulder 132 of the valve housing 130. In one embodiment, a friction fit can be used to fix the metal ring 120 with the valve housing 130. One of ordinary skill in the art would recognize from the present disclosure that alternative configurations can be used to connect the valve housing 30 to the metal ring 20.

As shown in FIG. 2, the metal ring 20 can include a plurality of posts 24. In one embodiment, the metal ring 20 includes four posts 24, and the mounting tab 50 includes four corresponding slots 54 located around the aperture 52. In one embodiment, the four posts 24 are each spaced approximately 90° circumferentially from each other around the metal ring 20. One of ordinary skill in the art would recognize from the present disclosure that the shape, quantity, configuration, and other characteristics of the posts 24 and slots 54 can be varied.

In one embodiment, the metal ring 20 is formed from steel. In another embodiment, the metal ring 20 is formed from low carbon steel, which is defined as less than 0.25% carbon. This carbon value is selected to enhance magnetic properties of the operation of a magnetic circuit within the assembly. The low carbon steel is also relatively soft to promote forming of the staking feature. In another embodiment, alternative materials, such as stainless steel or aluminum can be used for the metal ring 20. In one embodiment, the metal ring 20 can include a plating layer. One of ordinary skill in the art recognizes that alternative materials for the metal ring 20 can be used that can undergo plastic deformation to retain the metal ring 20 with the mounting tab 50 and the valve housing 30. In one embodiment, the metal ring 20 is formed by stamping. One of ordinary skill in the art would recognize that the metal ring 20 can be formed from alternative formation processes. As shown in FIG. 2, the radially inner and the radially outer surfaces of the posts 24 have a curvature that is identical to the curvature of the annular body 22. In one embodiment, the metal ring 20 has an outer diameter between 18 mm-24 mm, and more preferably has an outer diameter of 23 mm. In one embodiment, the metal ring 20 has an inner diameter defined by the radially inwardly extending flange 26 between 12 mm-20 mm, and more preferably has an inner diameter of 16 mm. In one embodiment, the metal ring 20 has a height between 7 mm-12 mm, and more preferably has a height of 9 mm, wherein the height of the metal ring 20 includes the posts 24. In one embodiment, the wall of the metal ring 20 has a thickness between 1.5 mm-3.0 mm, and more preferably has a thickness of 2 mm.

In one embodiment, deformation of the at least one axially extending post 24 of the metal ring 20 to clamp the valve housing 30 between the metal ring 20 and the mounting tab 50 is achieved by swaging or staking the metal ring 20. Deformation of the at least one axially extending post 24 of the metal ring 20 is preferably performed only by mechanical deformation. As used herein, mechanical deformation is defined as a non-heat and a non-ultrasonic based deformation. The mechanical deformation does not require heating of the metal ring 20 or melting of the metal ring 20. Mechanical deformation can include deforming the post 24' of the metal ring 20 to extend radially outwardly (as shown in broken lines in FIG. 3), radially inwardly, tangentially, or any other direction that provides retention of the metal ring 20 with the mounting tab 50. The mechanical deformation can include piercing the post 24 or beading a head portion of the post 24. One of ordinary skill in the art would recognize from the present disclosure that a variety of mechanical deformation methods can be used.

Having thus described various embodiments of the present method and solenoid assembly in detail, it will be appreciated and apparent to those skilled in the art that many changes, only a few of which are exemplified in the detailed description above, could be made in the solenoid assembly according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG OF REFERENCE NUMERALS solenoid valve assembly 10
metal ring 20, 120
annular body 22
axially extending post 24, 24'
radially inwardly extending flange 26
valve housing 30
radially outwardly extending shoulder 32
solenoid housing 40
outer wall 42
opening 44
axial end 46, 46'
mounting tab 50
aperture 52
slot 54

What is claimed is:

1. A method of assembling a solenoid valve assembly, the method comprising:
   (a) providing:
      a metal ring including an annular body with at least one axially extending post and a radially inwardly extending flange;
      a valve housing including a radially outwardly extending shoulder;
      a solenoid housing including an outer wall defining an opening at an axial end; and
      a mounting tab including an aperture and at least one slot;
   (b) supporting the shoulder of the valve housing against the flange of the metal ring;
   (c) inserting the at least one axially extending post through the at least one slot of the mounting tab;
   (d) deforming the at least one axially extending post of the metal ring to clamp the valve housing between the metal ring and the mounting tab, with the metal ring, the valve housing, and the mounting tab being captively secured with each other;
   (e) positioning the mounting tab at least partially within the opening at the axial end of the solenoid housing; and
   (f) bending the outer wall at the axial end of the solenoid housing to retain the solenoid housing to the mounting tab, the metal ring, and the valve housing.

2. The method of claim 1, wherein step (b) includes insert molding the shoulder of the valve housing with the flange of the metal ring.

3. The method of claim 1, wherein step (b) includes sliding the flange of the metal ring around the shoulder of the valve housing.

4. The method of claim 1, wherein the at least one post of the metal ring includes four posts and the at least one slot of the mounting tab includes four slots located around the aperture.

5. The method of claim 4, wherein the four posts are each spaced approximately 90° circumferentially from each other around the metal ring.

6. The method of claim 1, wherein step (d) includes swaging or staking the at least one post of the metal ring.

7. The method of claim 1, wherein step (d) only includes a mechanical deformation.

8. The method of claim 1, wherein the metal ring is formed from steel.

9. The method of claim 1, wherein the metal ring is formed from low carbon steel.

10. The method of claim 1, wherein the metal ring is formed from stainless steel.

11. The method of claim 1, wherein the metal ring is formed by stamping.

12. A solenoid valve assembly comprising:
   a metal ring including an annular body with at least one axially extending post and a radially inwardly extending flange;
   a valve housing including a radially outwardly extending shoulder, wherein the shoulder of the valve housing is supported against the flange of the metal ring;
   a solenoid housing including an outer wall defining an opening at an axial end; and
   a mounting tab including an aperture and at least one slot, wherein the at least one axially extending post extends through the at least one slot of the mounting tab, and deformation of the at least one axially extending post of the metal ring clamps the valve housing between the metal ring and the mounting tab, such that the metal ring, the valve housing, and the mounting tab are captively secured with each other, and the outer wall at the axial end of the solenoid housing is crimped to retain the solenoid housing to the mounting tab, the metal ring, and the valve housing.

13. The assembly of claim 12, wherein the metal ring is formed from steel.

14. The assembly of claim 12, wherein the shoulder of the valve housing is insert molded with the flange of the metal ring.

15. The assembly of claim 12, wherein the at least one axially extending post of the metal ring includes four posts and the at least one slot of the mounting tab includes four slots located around the aperture.

16. The assembly of claim 15, wherein the four posts are each spaced approximately 90° circumferentially from each other around the metal ring.

17. The assembly of claim 12, wherein the deformation of the at least one axially extending post of the metal ring includes swaging or staking the at least one post of the metal ring.

* * * * *